(12) United States Patent
Hossain et al.

(10) Patent No.: US 10,796,153 B2
(45) Date of Patent: Oct. 6, 2020

(54) SYSTEM FOR MAINTENANCE AND REPAIR USING AUGMENTED REALITY

(71) Applicant: INTERNATIONAL BUSINESS MACHINES CORPORATION, Armonk, NY (US)

(72) Inventors: Syed F. Hossain, Wappingers Falls, NY (US); Joshua Schaeffer, White Plains, NY (US); Gregg Arquero, White Plains, NY (US); Steven Burchfield, Woodstock, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/918,365

(22) Filed: Mar. 12, 2018

(65) Prior Publication Data
US 2019/0278992 A1 Sep. 12, 2019

(51) Int. Cl.
| | | |
|---|---|---|
| *G06K 9/00* | (2006.01) | |
| *G06F 1/16* | (2006.01) | |
| *G06T 11/60* | (2006.01) | |
| *G06T 7/00* | (2017.01) | |
| *G06F 16/903* | (2019.01) | |
| *H04L 29/08* | (2006.01) | |

(52) U.S. Cl.
CPC ......... *G06K 9/00671* (2013.01); *G06F 1/163* (2013.01); *G06F 16/903* (2019.01); *G06T 7/001* (2013.01); *G06T 11/60* (2013.01); *G06T 2200/24* (2013.01); *G06T 2207/30164* (2013.01); *H04L 67/12* (2013.01)

(58) Field of Classification Search
None
See application file for complete search history.

(56) References Cited

U.S. PATENT DOCUMENTS

| | | |
|---|---|---|
| 8,180,396 B2 | 5/2012 | Athsani et al. |
| 8,373,618 B2 | 2/2013 | Friedrich et al. |
| 8,760,471 B2 | 5/2014 | Ihara et al. |

(Continued)

FOREIGN PATENT DOCUMENTS

| | | |
|---|---|---|
| JP | 2009205556 A | 9/2009 |
| WO | 2009036782 A1 | 3/2009 |

OTHER PUBLICATIONS

S. Henderson et al., "Augmented Reality for Maintenance and Repair (ARMAR)", Air Force Research Laboratory, AFRL-RH-WP-TR-2007-0112, Final Report for Jun. 2005 to Aug. 2007, Aug. 2007.

*Primary Examiner* — Michelle Chin
(74) *Attorney, Agent, or Firm* — Cantor Colburn LLP; Teddi Maranzano

(57) ABSTRACT

An augmented reality system is provided. Aspects includes a device comprising a user interface, a camera, and a controller, the controller operable to receive data associated with a repair item. The controller is further operable to capture, by the camera, media associated with the repair item and analyze the data and the media to determine a candidate repair component of the repair item, wherein the candidate repair component is located at a target location. The controller is further operable to provide, via the user interface, a repair method for repairing the candidate repair component at the target location.

14 Claims, 5 Drawing Sheets

(56) References Cited

U.S. PATENT DOCUMENTS

| | | |
|---|---|---|
| 9,128,520 B2 | 9/2015 | Geisner et al. |
| 2002/0041327 A1 | 4/2002 | Hildreth et al. |
| 2008/0100570 A1* | 5/2008 | Friedrich ............. G05B 19/409 |
| | | 345/156 |
| 2012/0262486 A1 | 10/2012 | Raghoebardajal et al. |
| 2013/0010068 A1 | 1/2013 | Tiernan et al. |
| 2016/0140868 A1 | 5/2016 | Lovett et al. |

* cited by examiner

SYSTEM FOR MAINTENANCE AND REPAIR USING AUGMENTED REALITY

BACKGROUND

The present invention generally relates to augmented reality, and more specifically, to using augmented reality and image recognition for repairs and maintenance.

The rise of internet technology has affected an average person's ability to gather information on almost anything. A determined individual can find detailed guides on how to take matters into their own hands when tackling many of life's common problems. However, not all problems are easily identifiable and synthesizing information that is spread out over the internet is a daunting task. For example, if someone is trying to identify and fix a problem with their car, they would have to search the internet for symptoms of their issue, relate the issue to specific car parts, check serial numbers, search for possible solutions to the specific problems with the specific parts and then try it all out for themselves. The same difficulties with compiling and trying various solutions apply when fixing a variety of mechanical and electronic devices.

SUMMARY

Embodiments of the present invention are directed to an augmented reality system. A non-limiting example of the augmented reality system includes a device comprising a user interface, a camera, and a controller, the controller operable to receive data associated with a repair item. The controller is further operable to capture, by the camera, media associated with the repair item and analyze the data and the media to determine a candidate repair component of the repair item, wherein the candidate repair component is located at a target location. The controller is further operable to provide, via the user interface, a repair method for repairing the candidate repair component at the target location.

Embodiments of the present invention are directed to a computer-implemented method for servicing a repair item. A non-limiting example of the computer-implemented method includes receiving, by a controller, data associated with the repair item. Media associated with the repair item is captured by a camera. The data and the media is analyzed to determine a candidate repair component of the repair item, wherein the candidate repair component is located at a target location. A repair method is provided, via a user interface, for repairing the candidate repair component at the target location.

Embodiments of the invention are directed to a computer program product for servicing a repair item, the computer program product comprising a computer readable storage medium having program instructions embodied therewith. The program instructions are executable by a processor to cause the processor to perform a method. A non-limiting example of the method includes receiving, by a controller, data associated with the repair item. Media associated with the repair item is captured by a camera. The data and the media is analyzed to determine a candidate repair component of the repair item, wherein the candidate repair component is located at a target location. A repair method is provided, via a user interface, for repairing the candidate repair component at the target location.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
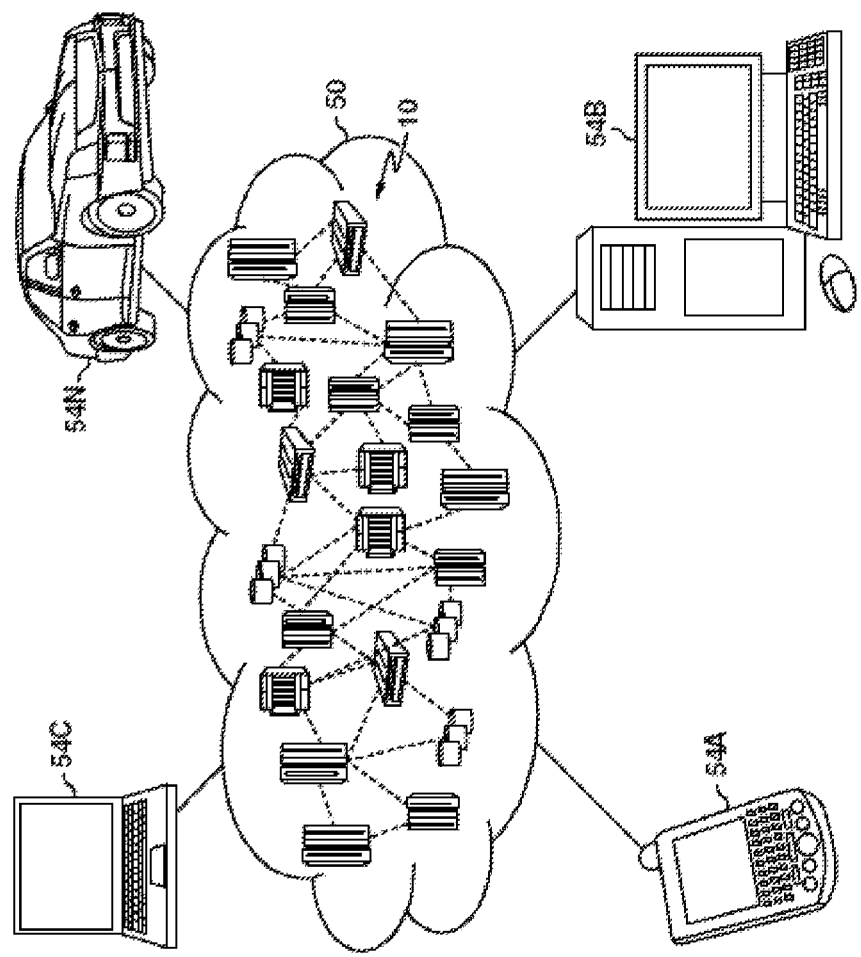
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): to capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
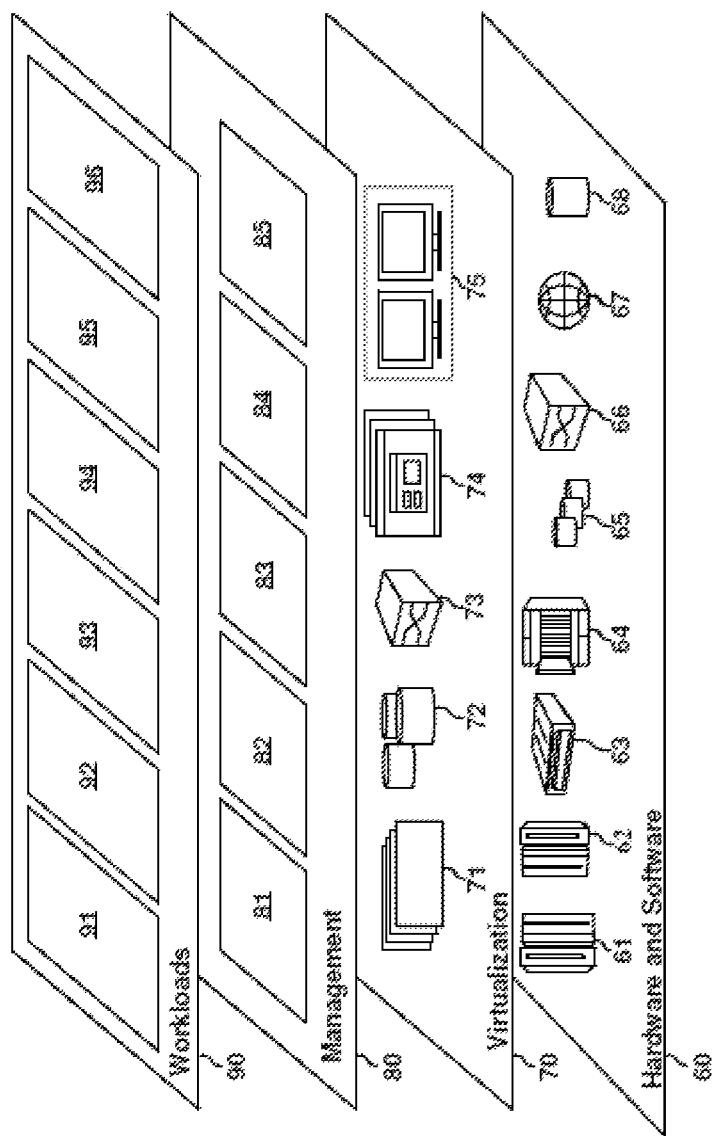
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmented reality 96.

Figure 3:
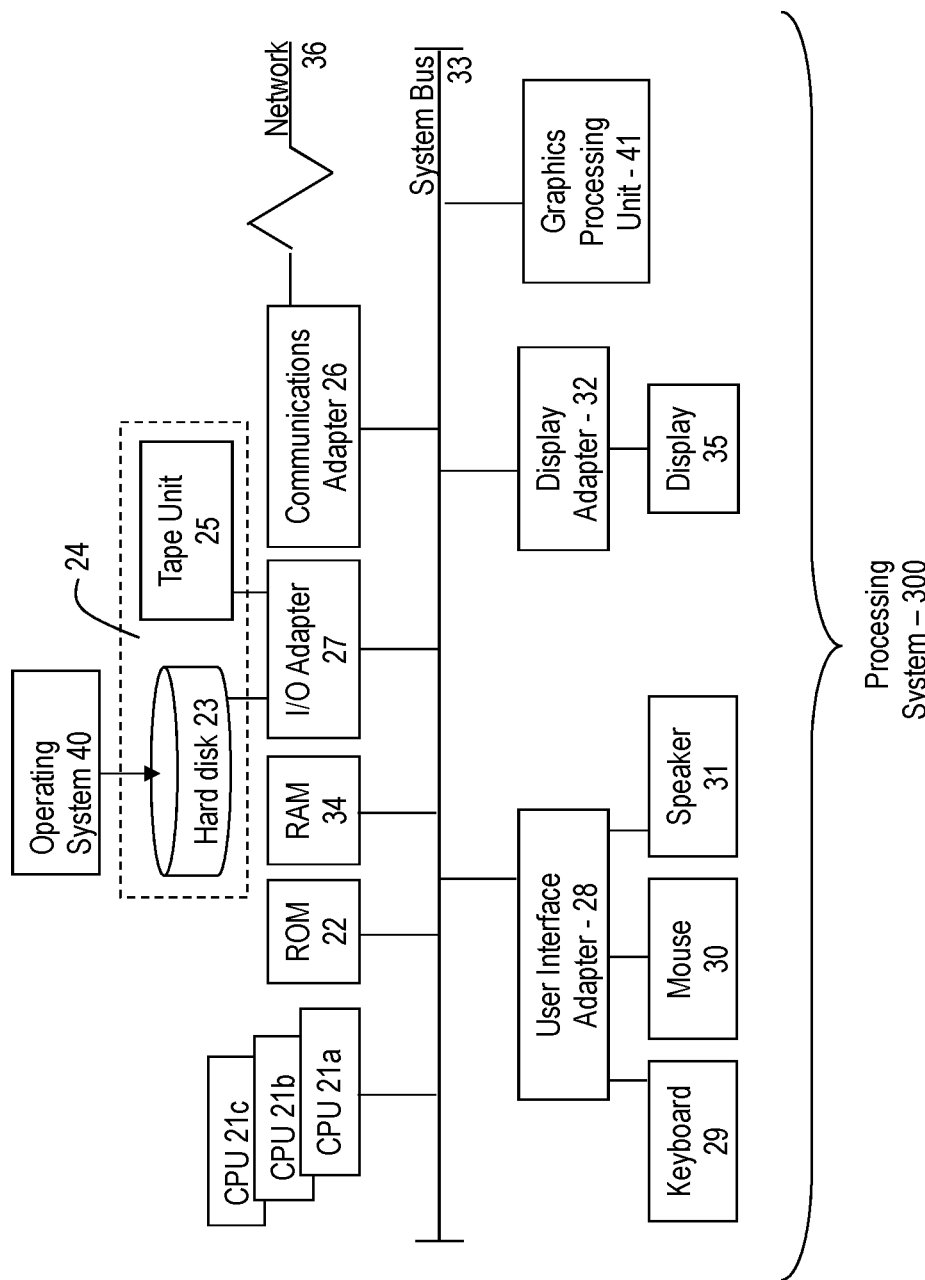
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, augmented reality technology can help users visualize any issues with an item that might require maintenance or repair. This visualization can guide a user to certain common troubleshooting areas of the repair item and direct the user on how to address maintenance or repair of the item. For example, users looking at a car engine might have issues trying to figure out the different components and which components of the engine might be causing the repair or maintenance issue. A starter, for example, is a common component that may require maintenance or repair. However, most car users would not be able to easily identify the location of the starter. Also, different types of car engines have different types of components. A starter from one car may be of a different type or in a different location than a starter from another car. Traditionally, a user would have to search the internet for symptoms of their issue, relate the issue to specific car parts, check serial numbers, search for possible solutions to the specific problems with the specific parts and then iteratively troubleshoot each of the possible solutions themselves. The same difficulties with compiling and trying various solutions apply when fixing a variety of mechanical and electronic devices. There exists a need for a system to assist a user with repairing various mechanical and electronic devices.

Turning now to an overview of the aspects of the invention, one or more embodiments of the invention address the above-described shortcomings of the prior art by providing a system utilizing image recognition technology to identify and analyze how to solve various electronic/mechanical service related problems. Using an augmented reality device, the system will gather information online about the parts and problems in the device's view and display it to the user in real time, guiding them towards the solution to their problem. The above-described aspects of the invention address the shortcomings of the prior art by using diagnostic information with image processing of video images captured of a repair item to diagnose a problem. The system simulates an augmented reality view of assembly/disassembly process without the need to consult an expert.

Figure 4:
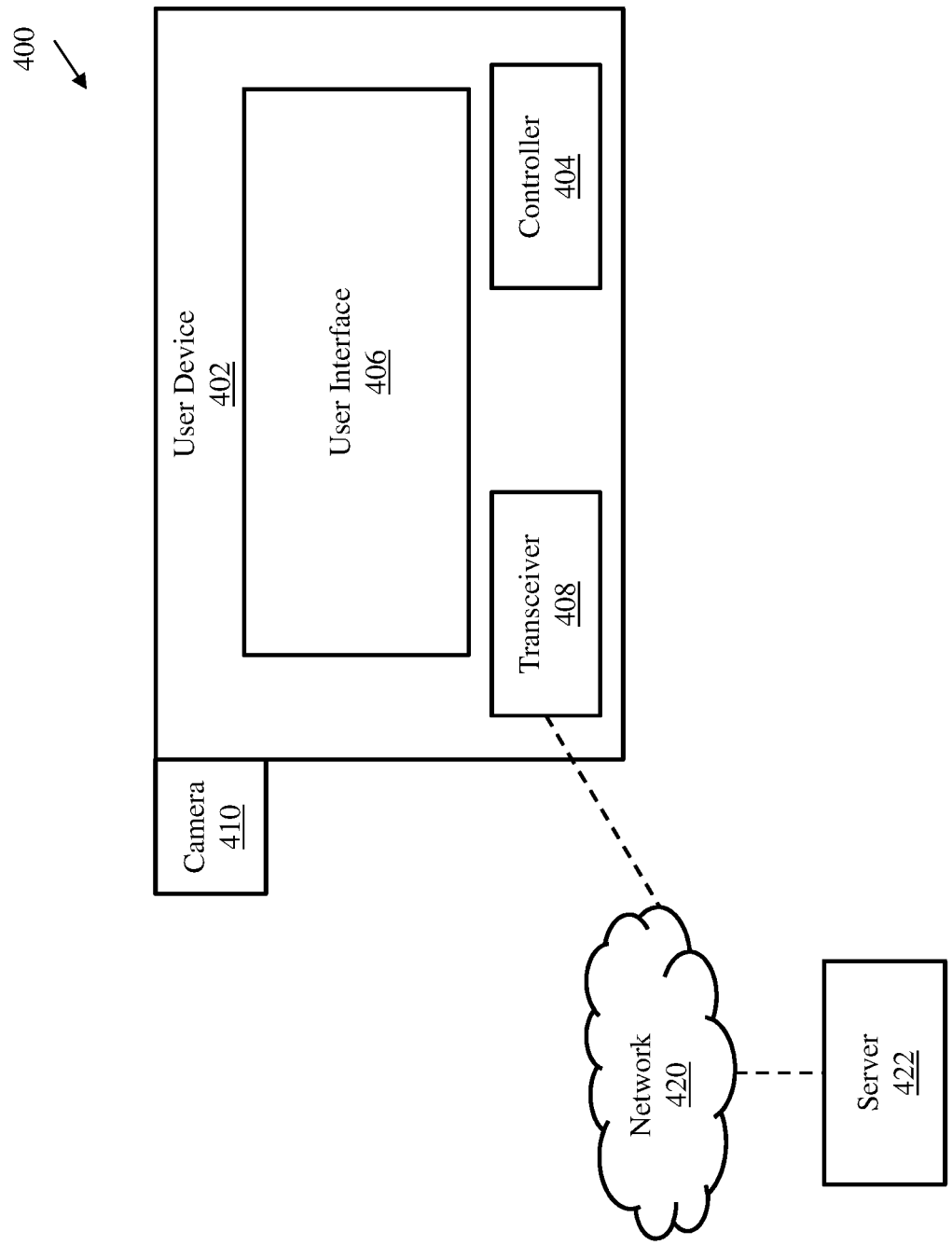
FIG. 4 depicts an augmented reality system according to one or more embodiments of the invention.

Turning now to a more detailed description of aspects of the present invention, FIG. 4 depicts an augmented reality system according to embodiments of the invention. The augmented reality system 400 includes a user device 402. The user device 402 includes a controller 404, a user interface 406, a transceiver 408, and a camera 410. The user device 402 can connect to a network 420 to access a server 422 utilizing the transceiver 408.

In one or more embodiments of the invention, the controller 404 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments, the augmented reality system 400 can identify and analyze how to solve various electronic/mechanical service related problems. The controller 404 can receive an input from a user or from any type of diagnostic device to assist with determining an issue or fault with a repair item (such as a car engine). The controller 404 can analyze the input to determine a potential repair issue associated with the repair item. For example, if a car's check engine light is on, a diagnostic tool can be utilized to determine a code for identifying a potential repair issue. This code or the data associated with the diagnostic tool can be transmitted to the controller 404 for analysis. In some embodiments, the user might input a generalized repair issues such as, for example, "the car will not start" or "clicking noise."

In one or more embodiments, the controller 404 analyzes the user input data associated with the repair item (such as the data from a diagnostic tool) and can direct the user to different locations at the repair item. The controller 404 can direct the user to different locations at the repair item by displaying augmented reality cues on the user interface 406. In one or more embodiments, the user device 402 is a wearable device that a user can wear over his head, for example. The user interface 406 can display to the user various data such as images or video collected from the camera 410. The user interface 406 can display real time images captured from the camera 410 for the user to focus on different areas of the repair item. Certain augmented reality cues can be overlaid on the images displayed on the user interface to guide or direct the user to each of the different components of the repair item. For example, if the controller 404 receives data associated with a starting issue with a car, the controller 404 can generate augmented reality cues that are displayed on the user interface 406 that direct the user to the location of the starter for the car engine. An augmented reality view can indicate the user needs to open up the hood of the vehicle by taking steps to release a lock, lift the car hood, etc. In one or more embodiments, the augmented reality view directs the user to a target location for the repair item. The target location can be determined by analyzing the user input data. For example, a user can input data associated with the repair item such as manufacturer name, model type, serial numbers, manufacture year, version types, and the like. Based on this user input data, the controller 404 using the transceiver 408 can gather additional data from a network 420 connected to a server 422. The server 422 can be any type of server that can have stored generalized or specialized data regarding repairs items. For example, if the use data shows the repair item to be a specific make and model of a vehicle, the server 422 can be a manufacturer server having specific data regarding the make/model/year and the like for the specific vehicle. In another embodiment, the server 422 could be any server on the World Wide Web that can contain information about the repair item. For example, a mechanics message board could have data regarding specific repair items and the system 400 can utilize keyword searches and other search techniques to identify relevant repair item data and potential resolutions.

In one or more embodiments of the invention, the system 400 can obtain data associated with a repair item through the use of the camera 410. The camera 410 can be any type of camera such as, for example, digital, infrared, and the like. The camera 410 can capture media associated with the repair item such as images (or series of images) of the repair item, video of the repair item as it is being operated or as a user is manipulating the repair item or images of various components of the repair item. Using image recognition, the controller 404 can analyze the media captured by the camera to assist in identifying a cause of the malfunction of the repair item and also formulate a repair method using both the media and the additional data obtained from the network 420 and/or stored locally on the system 400.

In one or more embodiments of the invention, the camera 410 can capture an image, a series of images, and/or video of various components for a repair item. A user can also input diagnostic information, repair item data, and other data associated with the repair issue into the system 400 for analysis by the controller 404. As described above, the controller can access reference repair item data through accessing the network 420 and a server 422 such as a manufacturer server. For example, for an electrical issue with a car, a manufacturer server can store images or videos of certain components that are working within normal tolerances. These images can be utilized as reference images for comparison to any candidate repair components of the repair item. While analyzing the user input data, the controller 404 can identify candidate repair components that could be causing the repair issue for the repair item. The camera 410 can capture images of the candidate repair components and the controller 404 can compare these images to the reference images using image analyzation techniques, to determine any changes between the reference images and the images of the candidate repair components. A comparison score can be obtained based on the changes between the images. This may be performed by comparing pixel values at the same locations in the candidate repair component image and the reference image, or by any other known image comparison tool. A difference in pixel value at one location in the candidate repair component image and the reference image indicates a change between the candidate repair component image and the reference image. The absolute values of all the pixel differences between candidate repair component image and the reference image may then be summed to generate a comparison score. The pixel comparisons may be made, for example, based on a change in color, change in brightness, etc. In one or more embodiments, if the comparison score exceeds a threshold value, the controller 404 can determine that the candidate repair component is causing the repair issue. The controller 404 can search the network 420 and server 422 to obtain a repair method for repairing the candidate repair component. The repair method steps can be overlaid in the user interface 406 providing step by step instructions for the repair.

Figure 5:
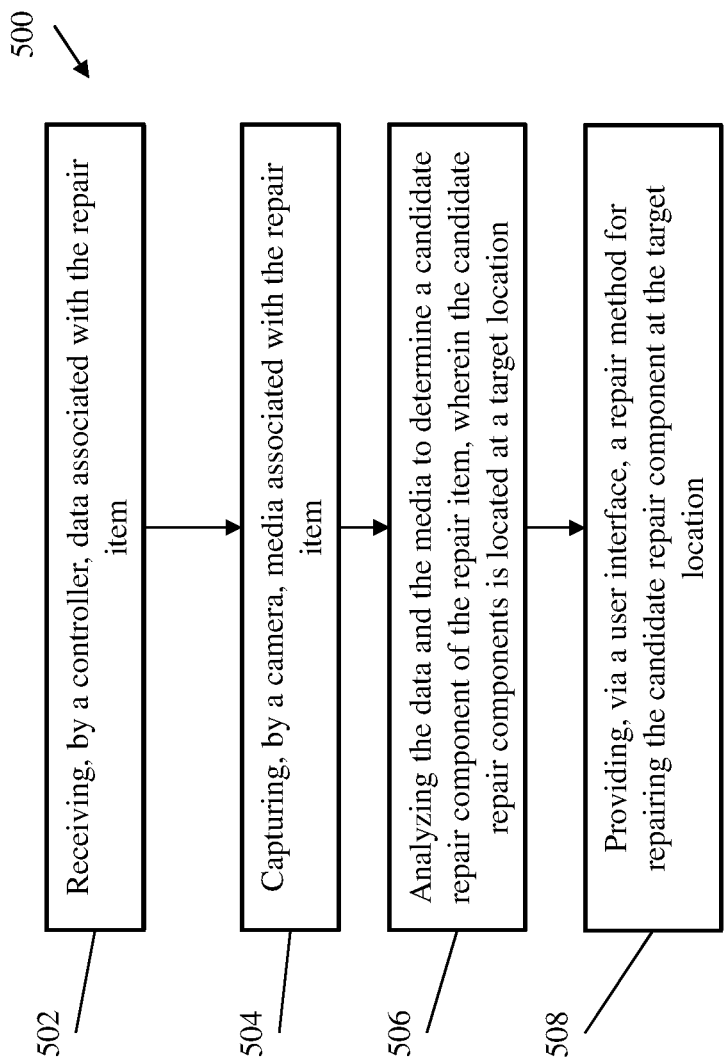
FIG. 5 depicts a flow diagram of a method for servicing a repair item according to one or more embodiments of the invention.

FIG. 5 depicts a flow diagram of a method for servicing a repair item according to one or more embodiments of the invention. The method 500 includes receiving, by a controller, data associated with the repair item, as shown at block 502. The method 500, at block 504 includes capturing, by a camera, media associated with the repair item. At block 506, the method 500 includes analyzing the data and the media to determine a candidate repair component of the repair item, wherein the candidate repair components is located at a target location. And at block 508, the method 500 includes providing, via a user interface, a repair method for repairing the candidate repair component at the target location.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An augmented reality system comprising:
    a device comprising a user interface, a camera, and a controller;
    the controller operable to:
        receive data associated with a repair item, the data comprising a description of an issue associated with the repair item and diagnostic data, received from a diagnostic tool, associated with the repair item;
        capture, by the camera, media associated with the repair item, wherein the media comprises one or more images of the repair item;
        access an outside resource to determine general data associated with the repair item based on the data, wherein the outside resource comprises at least one of a manufacturer website for the repair item and a mechanic message board for the repair item;
        analyze the data the media, and the general data to determine a candidate repair component of the repair item, wherein the candidate repair component is located at a target location; and
        wherein determining the candidate repair component of the repair item comprises:
            directing a user to the target location for the candidate repair component;
            acquiring reference repair item data, wherein the reference repair data comprises one or more images of a working component that is of a same type component as the candidate repair component; and
            comparing the media associated with the candidate repair component with the one or more images of the working component to determine a fault in the candidate repair component, wherein determining the fault comprises:
                determining a comparison score between the one or more images of the repair item and the one or more images of the working component, wherein the comparison score is based on an absolute value of all pixel differences between the one or more images of the repair item and the one or more images of the working component;
        provide, via the user interface, a repair method for repairing the candidate repair component at the target location, wherein providing the repair method comprises:
            generating an augmented reality view of the candidate repair component, wherein the augmented reality view of the candidate repair component comprises a simulated view of the candidate repair component;
            overlaying the simulated view on the target location; and
            generating one or more tasks for a user to complete to repair the candidate repair component.

2. The augmented reality system of claim 1, wherein the reference repair item data comprises reference media associated with a reference repair item; and
    wherein determining the fault in the candidate repair component comprises:
        comparing the media to the reference media to determine a difference in a reference component and the candidate repair component.

3. The augmented reality system of claim 1, wherein each of the one or more tasks comprise an indicia directing a user to a troubleshooting point associated with the candidate repair component; and wherein the controller is further operable to:
    receive an input from the user indicating completion of a task in the repair method.

4. The augmented reality system of claim 1, wherein the augmented reality view of the candidate repair component comprises an exploded view of the candidate repair component.

5. The augmented reality system of claim 1, wherein acquiring reference repair item data comprises searching, by the controller, a repair item database; and
    downloading a model repair item data from the repair item database.

6. The augmented reality system of claim 1, wherein the data comprises diagnostic data associated with the repair item.

7. The augmented reality system of claim 1, wherein the data comprises equipment data associated with the repair item.

8. The augmented reality system of claim 1, wherein the device is a wearable device.

9. A computer-implemented method for servicing a repair item, the method comprising:
    receiving, by a controller, data associated with the repair item, the data comprising a description of an issue associated with the repair item and diagnostic data, received from a diagnostic tool, associated with the repair item;
    capturing, by a camera, media associated with the repair item, wherein the media comprises one or more images of the repair item;
    accessing an outside resource to determine general data associated with the repair item based on the data, wherein the outside resource comprises at least one of a manufacturer website for the repair item and a mechanic message board for the repair item;

analyzing the data, the media, and the general data to determine a candidate repair component of the repair item, wherein the candidate repair components is located at a target location; and wherein determining the candidate repair component of the repair item comprises:

directing a user to the target location for the candidate repair component;

acquiring reference repair item data, wherein the reference repair data comprises one or more images of a working component that is of a same type component as the candidate repair component; and comparing the media associated with the candidate repair component with the one or more images of the working component to determine a fault in the candidate repair component, wherein determining the fault comprises:

determining a comparison score between the one or more images of the repair item and the one or more images of the working component, wherein the comparison score is based on an absolute value of all pixel differences between the one or more images of the repair item and the one or more images of the working component;

providing, via a user interface, a repair method for repairing the candidate repair component at the target location, wherein providing the repair method comprises:

generating an augmented reality view of the candidate repair component, wherein the augmented reality view of the candidate repair component comprises a simulated view of the candidate repair component;

overlaying the simulated view on the target location; and generating one or more tasks for a user to complete to repair the candidate repair component.

10. The computer-implemented method of claim 9, wherein the reference repair item data comprises reference media associated with a reference repair item; and wherein determining the fault in the candidate repair component comprises:

comparing the media to the reference media to determine a difference in a reference component and the candidate repair component.

11. The computer-implemented method of claim 9, wherein each of the one or more tasks comprise an indicia directing a user to a troubleshooting point associated with the candidate repair component; and further comprising receiving an input from the user indicating completion of a task in the repair method.

12. A computer program product for servicing a repair item, the computer program product comprising a computer readable storage medium having program instructions embodied therewith the program instructions executable by a processor to cause the processor to perform a method comprising:

receiving, by a processor, data associated with the repair item, the data comprising a description of an issue associated with the repair item and diagnostic data, received from a diagnostic tool, associated with the repair item;

capturing, by a camera, media associated with the repair item, wherein the media comprises one or more images of the repair item;

accessing an outside resource to determine general data associated with the repair item based on the data, wherein the outside resource comprises at least one of a manufacturer website for the repair item and a mechanic message board for the repair item;

analyzing the data, and the media, and the general data to determine a candidate repair component of the repair item, wherein the candidate repair components is located at a target location; and wherein determining the candidate repair component of the repair item comprises:

directing a user to the target location for the candidate repair component;

acquiring reference repair item data, wherein the reference repair data comprises one or more images of a working component that is of a same type component as the candidate repair component; and comparing the media associated with the candidate repair component with the one or more images of the working component to determine a fault in the candidate repair component, wherein determining the fault comprises:

determining a comparison score between the one or more images of the repair item and the one or more images of the working component, wherein the comparison score is based on an absolute value of all pixel differences between the one or more images of the repair item and the one or more images of the working component;

providing, via a user interface, a repair method for repairing the candidate repair component at the target location, wherein providing the repair method comprises:

generating an augmented reality view of the candidate repair component, wherein the augmented reality view of the candidate repair component comprises a simulated view of the candidate repair component;

overlaying the simulated view on the target location; and generating one or more tasks for a user to complete to repair the candidate repair component.

13. The computer program product of claim 12, wherein the reference repair item data comprises reference media associated with a reference repair item; and wherein determining the fault in the candidate repair component comprises:

comparing the media to the reference media to determine a difference in a reference component and the candidate repair component.

14. The computer program product of claim 12, wherein each of the one or more tasks comprise an indicia directing a user to a troubleshooting point associated with the candidate repair component; and further comprising receiving an input from the user indicating completion of a task in the repair method.

\* \* \* \* \*